Sept. 7, 1965   A. M. MOEN   3,204,656
VALVE CARTRIDGE
Filed Sept. 9, 1963   2 Sheets-Sheet 1
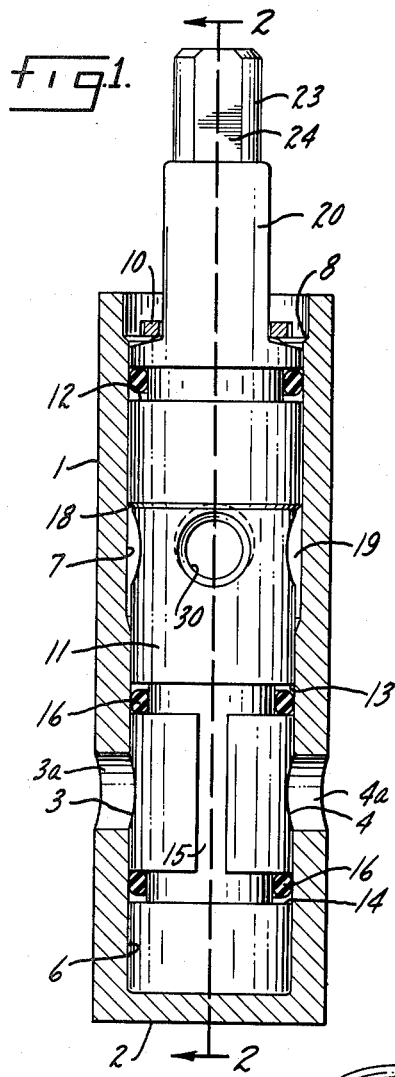
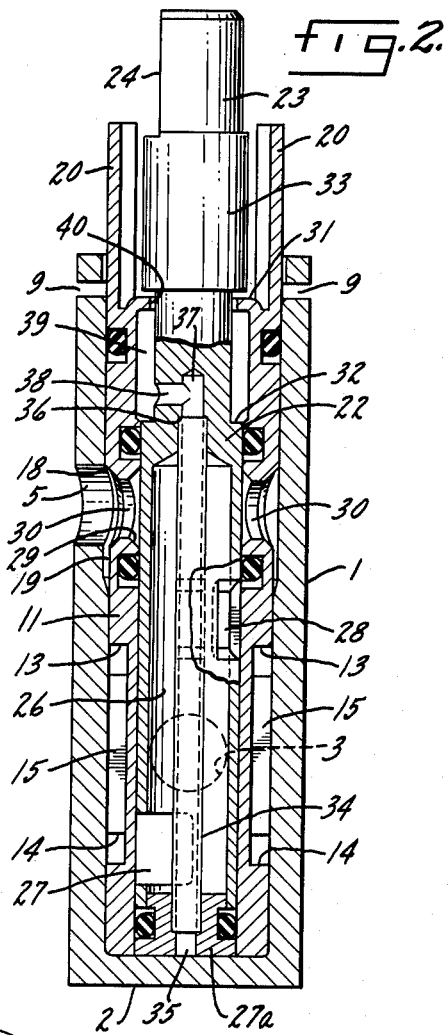
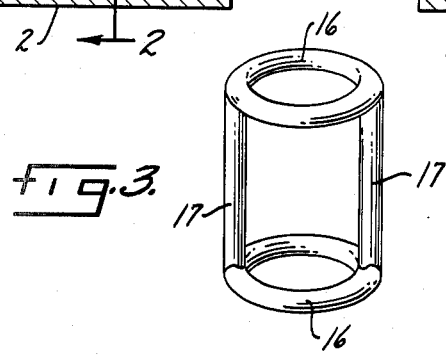
INVENTOR.
Alfred M. Moen,
BY Parker & Carter
Attorneys.

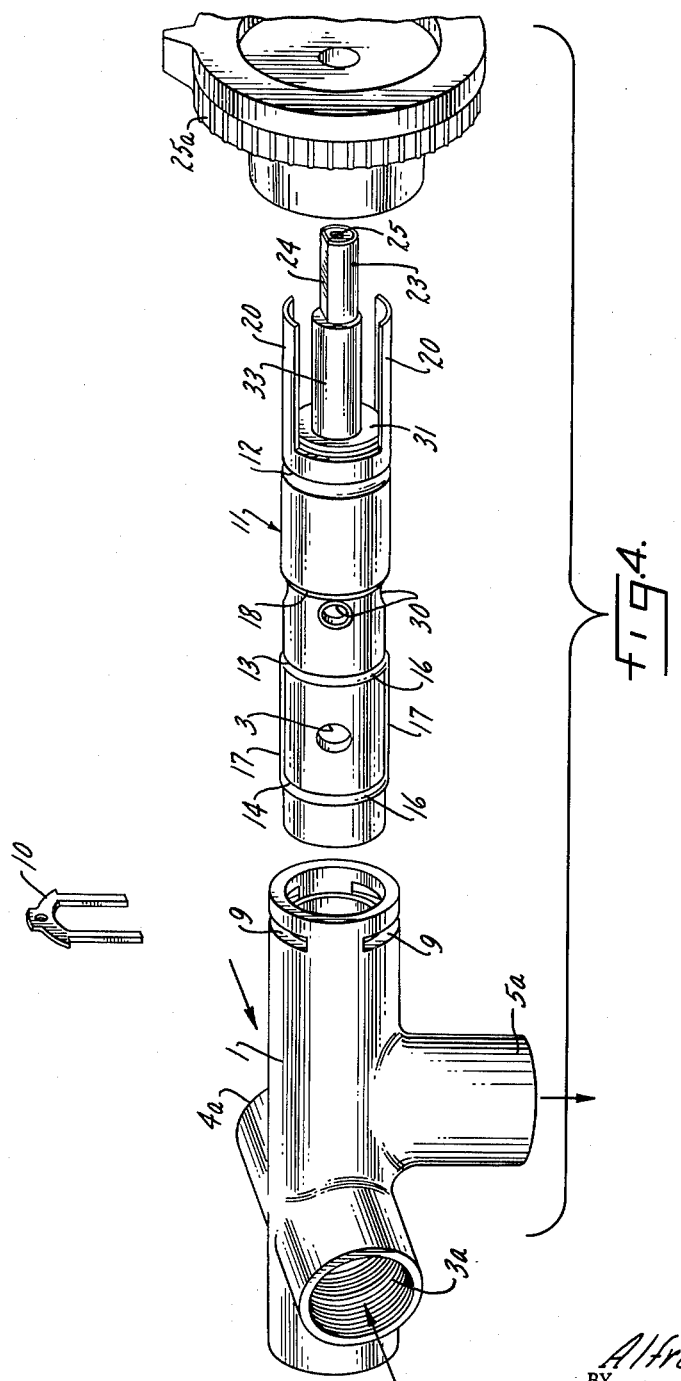

United States Patent Office 3,204,656
Patented Sept. 7, 1965

3,204,656
VALVE CARTRIDGE
Alfred M. Moen, 25 Lakeview Drive, R.D. 1,
Grafton, Ohio
Filed Sept. 9, 1963, Ser. No. 307,712
4 Claims. (Cl. 137—454.2)

This invention relates to a valve or fluid control means. It has for one object to provide a unitary cartridgelike member which includes within itself relatively movable parts and which as a unit may be put into place in a housing for original installation and removed therefrom when repair is required so that it may be discarded and a new cartridgelike member inserted in its place, and is a continuation in part of my co-pending application Serial No. 6,452, filed February 3, 1960, now Patent No. 3,103,231.

An object of this invention is therefore to provide a disposable cartridgelike member for unitary insertion in, use within, and removal from a housing.

Another object is to provide a mixing valve assembly into which a plurality of fluids are introduced from different directions and within which fluids are mixed and discharged if desired in a chosen proportion of mixture.

Another object is to provide a cartridgelike valve assembly which within itself includes the movable parts of a mixing valve, the movable parts being effective to open or close a discharge passage through the valve assembly and to mix fluids of different kinds or qualities as desired.

Another object is to provide a mixing valve of the types indicated above which will be fully pressure balanced at all times whether the valve is open for discharge or closed against discharge.

Other objects will appear from time to time throughout the specification and claims.

The invention is illustrated more or less diagrammatically in the accompanying drawings wherein:

FIGURE 1 is a longitudinal section through one form of the device, the housing being shown in section and the cartridge assembly being shown in elevation;

FIGURE 2 is a section taken at line 2—2 of FIGURE 1 showing the sleeve of the cartridge in section and the stem in elevation;

FIGURE 3 is a perspective of the form of a combined O-ring assembly removed from its association with the valve cartridge shown in FIGURES 1 and 2; and FIGURE 4 is a perspective view of the plumbing fitting with the cartridge in position for insertion into it and with a handle in position for attachment to the valve.

The invention comprises a housing member such as the member 1 which is fixed in relation to the plumbing connections, such as the water inlet pipes. It is therefore in effect a relatively permanent part of the water supply system of a building. The water supply connections may be engaged with the threaded extensions 3a and 4a of FIGURE 4 or they may be connected to the openings 3 and 4 of FIGURE 1, for example. These are the water inlet openings and water supply pipes may be connected to them by threaded engagement, by being welded in place or otherwise secured to the housing 1. Whatever the precise details may be, the housing 1 or its equivalent member is permanently secured in the plumbing system and particularly in the water supply system. A spout outlet connection is engaged with the outlet opening 5 of FIGURE 2. It may be fastened to that connection in any fashion convenient to carry out the discharge of water from the opening 5. In the form of FIGURE 4, a member 5a is integral with the housing 1. When the member 5a is present the discharge spout will be secured or connected to that member.

In the form shown there is thus a fixed housing member secured to the water supply system and to the water discharge connection and since this housing member is mounted permanently in the system it would be inconvenient and costly to remove it after wear has occurred. Therefore, it is one of the objects of the invention to provide a valve construction for faucets in which the permanent housing member 1 is not subject to the general wear to which the moving parts of the faucet are subject. To accomplish this the invention comprises, in addition to the fixed and relatively permanent housing 1, a sleeve within which a valve stem may be rotated and reciprocated. The sleeve itself once it has been put into position within the fixed housing does not move and therefore neither the sleeve nor any other part of the valve mechanism moves in contact with the housing, and thus the housing is not subject to wear during valve operation. Should the valve assembly require repair or renewal, the entire cartridge is withdrawn as a unit. The sleeve and the stem are thus withdrawn as a unit and a new properly functioning cartridge is reinserted. The only movement against the housing which occurs is when the cartridge is first inserted and when it is finally removed for replacement. The structure of the invention as disclosed, therefore, comprises means which avoids wear upon any fixed or relatively permanent part of the water supply and water discharge system. In particular it provides means for protecting the housing, such as the housing 1, from wear incident to valve operation. The only wear which occurs as a result of valve operation is that between the valve stem and the sleeve within which it is positioned and the sealing parts of the sleeve or valve stem.

Like parts are designated by like characters throughout the specification and drawings.

In the form shown in FIGURES 1 and 2, 1 is a housing having a closed end 2 and a plurality of inlet ports 3 and 4. It is provided with one or more outlet ports 5 and it may be formed internally with two diameters; thus a portion 6 is of less diameter than the portion 7. At its open end the housing 1 may be tapered as at 8. It may also be provided with a keyway slot 9 to receive a key 10 to hold the cartridge or valve assembly in position within the housing.

In the form shown the cartridge or valve assembly includes a sleeve designated generally by the numeral 11. This is a hollow member provided on its exterior with three grooves 12, 13 and 14 to receive O-rings. The grooves 13 and 14 are connected by longitudinal channels 15. O-rings 16 are positioned in the grooves 13 and 14 and are connected by longitudinal sections 17 which, when the O-ring construction is in place, will lie each within one of the channels 15. The invention is not limited to this particular type of O-ring or sealing means. The O-ring which would lie within the groove 12 is preferably a conventional O-ring and has been omitted. The sleeve 11 is provided with an external chamfer 18. The purpose of the chamfer is primarily to provide an annular clearance space 19 about the sleeve and between it and the inner face of the housing 1 so that fluid may pass about the valve cartridge and reach the discharge outlet 5 for discharge. The sleeve 11 may be cut away at its outer end to provide ears 20.

Within the sleeve 11 a valve stem 22 is mounted for rotation and reciprocation. It is preferably provided at one end with a reduced portion 23 which may be flattened as at 24 and it may be provided with a threaded cavity 25. The exposed end of the stem receives a handle 25a which is correspondingly shaped to fit against the flat portion and is held in place by a screw, not shown, which is screwed into the threaded cavity 25. The details of the handle form no essential part of the invention. It is sufficient for the purposes of the invention that a handle be provided so that the valve stem may be rotated and reciprocated. The stem in the form shown in FIG- URE 2 is hollow, as indicated at 26, and this hollow may extend to the inner end of the stem. The stem adjacent its inner end is cut away as at 27 to provide an inlet port through which fluid may reach the interior of the stem when the cut away portion is in alignment with one or both of the inlet ports 3 and 4. The hollow stem is closed at its inner end by the closure member 27a which may be eternally slotted to receive an O-ring.

The stem is provided intermediate its ends with one or more slots or openings 28 through which fluid may be discharged from within the stem when the opening or openings are in alignment with an internal groove 29 formed within the sleeve 11. The internal groove is in communication with one or more outlet ports 30 formed in the sleeve and also in communication with one or more outlet ports 5 in the housing. If desired, grooves may be formed on the interior of the sleeve 11 on opposite sides of the internal groove 29. These added grooves, if present, may contain O-rings.

The sleeve 11 is provided with an integral inturned flange 31 which extends inwardly beyond the shoulder 32 formed on the valve stem 22 and extends inwardly beyond the enlargement 33 formed on the valve stem 22 and thus limits the reciprocation of the stem with respect to the sleeve 11.

The valve stem 22 includes a generally tubular member 34 which is hollow; at its inner end, it is seated in the member 27a. The member 27a is provided with a passage 35 which extends through it and communicates with the interior of the hollow tubular member 34.

At its upper end the tubular member 34 is seated as at 36 in a socket formed in the valve stem 22. A passage 37 in the valve stem 22 is communication with the hollow interior of the tubular member 34. An angularly disposed passage 38 is in communication with the passage 37. The passage 38 leads to an annular space or chamber 39 within the sleeve 11 and between it and the valve stem 22. Clearance 40 is provided between that portion of the valve stem 22 which is adjacent to it and the flange 31. The clearance 40 is open to the air; thus an air passage is provided from end to end of the cartridge. It includes the passage 34, the passages 37 and 38, the annular space 39 and the clearance space 40.

Among the objects of this invention above mentioned is mentioned that of complete pressure balancing of the valve in all positions of adjustment. Complete pressure balancing is desirable for many commercial applications. By the expression "complete pressure balancing" it is not intended to limit this invention to absolute, total, complete balancing. For some purposes, it may be desirable to have the valve "overbalanced" or "underbalanced" and it is within the contemplation of this invention to produce such a valve. It is to be understood therefore that while complete pressure balancing is satisfactory and in some cases is desirable or essential, in other embodiments only that degree of balance is required that will insure satisfactory valve operation. Some friction is inevitable. For most purposes that degree of pressure balance which is required is such that liquid pressure within the faucet will not cause it to open by itself, or to close or to move by itself without manipulation by the operator. The structure shown in the drawings accomplishes this result and solves one of the problems involved in the design of a satisfactory valve cartridge for a single handle faucet system.

The use and operation is as follows:

In the form shown, the valve cartridge is inserted in a fixed housing which forms a part of the permanent plumbing connections, by means of which hot and cold water is furnished to a faucet. The housing as shown comprises the member 1 with two inlet ports 3a and 4a, each of which is connected to an inlet or water supply pipe, one to the hot water supply pipe and the other to the cold water supply pipe. This connection leads through the inlet ports 3a and 4a in the housing 1. When the cartridge is in position of FIGURES 1 and 2, the inlet ports 3 and 4 of the cartridge sleeve 11 are in register with the inlet ports 3a and 4a respectively of the housing 1. The clip 10 passes through notches or openings 9 in the housing 1 and engages the portions 20 of the cartridge sleeve 11 and thus positioned and holds the inlet ports of the cartridge sleeve and housing in register with each other. The clip 10 thus not only prevents removal or accidental displacement of the cartridge so long as it is in place, but it insures proper original positioning of the cartridge with respect to the water inlet passages and holds the cartridge in such proper position.

FIGURE 4 illustrates the parts in perspective and shows the cartridge adjacent the housing and in proper position to be inserted into the housing. FIGURE 4 shows the clip adjacent the slot 9, into which it will be inserted after the cartridge has been inserted in the housing. When the cartridge has been fully inserted into the housing in proper position to register the inlet ports 3 and 4 respectively with inlet passages 3a and 4a, the ears 20 of the sleeve 11 are properly positioned with respect to the slots 9 of housing 1 to permit installation of the clip 10 in the housing. When thus inserted with the cartridge in proper position, the clip will be in contact with the sides of the ears 20 and will also be in contact with the portions of the housing 1 adjacent the ends of the slots 9. So long as the clip remains in that position, the cartridge will be held in proper position and will be held against removal. The clip is shown in section in this position in FIGURE 1.

The hollow valve stem is shown in the "closed" position in FIGURE 2. The inlet passage 27 to the interior 26 of the valve stem 22 is not in register with the inlet openings 3 or 4 in this position; hence in this position no liquid enters the hollow valve stem.

When the faucet is to be opened, the valve stem is raised from the position of FIGURE 2. It is thus moved outwardly with respect to the housing 1. When the opening 27 is in register with either or both of the openings 3 and 4, liquid may enter and move into the hollow valve stem. The outlet openings or passages 28 of the hollow valve stem are so positioned with respect to the opening 27 that when the opening 27 is in register wholly or partially with either or both of the inlet openings 3 or 4, the outlet openings 28 will be wholly or partially in register with one or another of the outlet ports 30 of the sleeve 11. Since the ports 30 communicate with the outlet opening 5, liquid at the proper mixed or other desired temperature will be discharged from the faucet through a spout, not shown, which is in communication with the member 5a. The spout is not shown in detail because its details form no essential part of the present invention. Any suitable spout or discharge means may be connected to the member 5a.

The volume of liquid discharged is controlled by selecting and maintaining the desired degree of register of opening 27 with either or both of the inlet openings 3 and 4. The parts are so dimensioned and proportioned that it is possible for the port or opening 27, when the valve stem is moved to the open position, to be in communication with only the inlet port 3, or only the inlet port 4, or partially in communication with each of these inlet ports.

The opening of the faucet is accomplished by longitudinal movement of the valve stem which brings the opening 27 to the desired degree in register with either or both of the ports 3 or 4. Assuming that the one port supplies hot water and that the other port supplies cold water, suitable mixing of these two supplies of water is accomplished by rotation of the hollow valve stem. As above stated, the parts are preferably so proportioned that the water which is discharged through the opening 5 may be all hot, or all cold, or a mixture of the two.

When sufficient water has been discharged, the valve is closed by pushing in upon the handle and thereby returning the valve stem to the position of FIGURE 2. If desired, the valve may be left in the position of rotation to which it has been moved during the operation just described. Thereafter when further water is required, if the valve has not been rotated, the valve stem need only be pulled out to the open position and water will be delivered at the same temperature for which the valve had been previously adjusted.

It is desirable to prevent the entrapment of air within the cartridge. Entrapped air might make the operation of the valve difficult and might cause an unbalanced condition or might contribute to an unbalanced condition. It is important therefore to provide means for venting air from within the cartridge to the atmosphere. In the particular form of air venting here shown, the cartridge is provided with a passage 35 at its lower end; in sealed communication with this passage is the tube 34 which is in sealed communication with the passages 37 and 38. The passage 38 is in open communication with the annular chamber 39 which, through the clearance space 40, is vented to the atmosphere adjacent the other end of the valve stem. Although the structure just described permits venting to the atmosphere outside of the cartridge in the direction of the handle, this direction of venting is not essential. An opening could be formed in the end 2 of the housing and air could be discharged in this fashion. The effect of the tube 34 and the associated passages as shown and the effect of a venting opening formed through the wall of the housing is in each case to provide pressure balancing with respect to the atmosphere and to prevent the entrapment of air and the prevention of retension of the entrapped air within the cartridge. Thus, the cartridge is balanced with respect to atmospheric air pressure.

The cartridge is balanced with respect to the pressure of liquid flowing through it and the valve stem is balanced with respect to the pressure to which it is subjected. The valve stem is of uniform diameter throughout its sealed and water passage areas. Consequently, the water pressure to which the stem is subjected can only be opposed by the sealing surfaces which comprise the stem and by the bore of the cartridge. Since these are equal to each other in area, the stem cannot be moved by water pressure and therefore it is completely water pressure balanced. Since the valve stem is of constant diameter, there is no differential area upon which the liquid pressure within the stem could be effective to move the stem.

As the water flow is described above, it is clear that the water enters the opening 27 and passes through the openings or windows 28. The fact that the water under pressure is within the stem insures the balance of the stem regardless of the possibility of different sized openings inside the stem because the pressure is exerted both on the inside and the outside of the stem. Pressure is exerted on the outside of the stem at the point or points of sealing. As shown in FIGURE 2, the O-ring at the bottom of the stem and the O-ring next above it provide the seal and accomplish the balanced condition when the valve stem is in the closed position.

After the valve stem is moved to the open position, so that water flows through one or both of the inlet ports 3 and 4 into the opening 27 and finally through the hollow portion of the valve stem and through the openings 28 and 30 to the discharge, the sealing in that position is accomplished by the lower O-ring and by the O-ring above the ports 30, as shown in FIGURE 2. In this position, any back pressure is sealed by the upper O-ring above the outlet ports 30 and by the O-ring adjacent the inner or bottom end of the stem.

In the open position, the cartridge is balanced by means of O-rings 16 in the grooves 13 and 14. In this position, when the water is allowed to flow out through the discharge or discharge openings 30, the bottom O-ring 16 and the upper O-ring in the chamber 12 provide the balance for the cartridge. This is possible because of the presence of the vent tube 34 of FIGURE 2, or because of any suitable vent from within the housing 1 which allows the bottom chamber below the cartridge and below the valve stem, including the bottom area of the cartridge shell, to be the same with respect to the atmospheric pressure to which each is subjected.

Thus by the construction shown, the cartridge as a whole is balanced within the housing and the pressure to which it is subject would not move the cartridge as a whole out of the housing. The clip 10, among other purposes, serves to retain the cartridge against accidental removal from the housing by an outward pull of an operator on the handle 25a. The valve stem is also pressure balanced within the sleeve by the construction shown and above described.

If as above mentioned it is desired to vent possible air pressure from within the cartridge in a direction generally away from the outer end, that is to say, from the end of the valve stem to which the handle is to be secured and an opening is made in the cartridge sleeve for venting, this may be accomplished by omitting the tube 34 from the valve stem assembly and by omitting or closing the passages 35, 37 and 38. Thus the bottom or inner end of the valve stem would be closed by the member 27a, which in that form would be imperforate so that liquid could not escape from the bottom of the valve stem. Similarly because of the omission or closure of the perforations 37 and 38, liquid could not escape from the valve stem to that end. Because the tube 34 is of constant diameter and hence of constant cross sectional area, its omission from the valve stem would not alter the proportion of the areas within the valve stem subject to water pressure and the water pressure balanced condition would remain undisturbed. Whatever form the air venting means may take, it is preferable that means be provided to vent air from within the cartridge to prevent the entrapment of air which would prevent or make more difficult the movement of the valve stem by the operator. Thus air venting may occur in a direction toward the handle end of the valve stem as shown in FIGURE 1 or it may occur in another direction. It is immaterial what this direction may be so long as means are provided for venting the air from below the inner end of the valve stem. When the word below is used in this specification, it does not imply the location of the valve in use in a vertical position. The word below is used as a convenient way to describe the relative location of parts in view of the fact that FIGURES 1, 2 and 3 are drawn vertically on Sheet 1. The valve cartridge is shown in FIGURE 4 as in a horizontal position and it is probable that in the most common uses of the cartridge, it will be in the horizontal or inclined position, but it is not limited in its use or in its applicability to any particular position whatever.

Although I have shown an operative form of my invention, it will be recognized that many changes in the form, shape and arrangement of parts may be made without departing from the spirit of the invention. While it is generally preferable to provide means for preventing separation of the valve stem 22 from the sleeve 11 and while this means as shown comprises the inturned flange 31 which is contacted by the shoulder 32 in the relative outward movement of the stem and thus prevents separation of the parts, other means might be provided for limiting the relative movement of the sleeve and stem.

I claim:

1. In combination in a valve cartridge, a sleeve member adapted for insertion in a fixed housing into which two separate streams of liquid are discharged, said sleeve being provided with a plurality of external grooves suitable for receiving O-rings, O-rings positioned in said grooves and comprising means for sealing the sleeve against leakage within the housing, said sleeve being provided with an in- hollow valve stem positioned within said sleeve and the housing being shaped adjacent said outlet port to provide an annular clearance space about said sleeve, and a hollow valve stem positioned within said sleeve and mounted for rotation and reciprocation with respect thereto, said stem including a portion extending beyond said sleeve and shaped to receive a handle for moving said stem, and means within said cartridge for pressure balancing said stem, said means including parts defining an air path through said valve stem from its inner end to its outer end and comprising a closure part closing one end of said stem, said closure part cooperating with said sleeve and housing to define a chamber, said closure part being shaped to provide a passage therethrough communicating with said chamber, and a tubular member positioned within said stem and in communication with said passage, said tubular member extending through said stem and being in communication with the atmosphere adjacent the end of said stem having said handle receiving portion.

2. The structure of claim 1 further characterized in that said tubular member is in sealing engagement with said stem.

3. The structure of claim 1 further characterized by longitudinal sealing members joining said O-rings, and grooves in said sleeve shaped to receive said longitudinal sealing members.

4. The structure of claim 1 further characterized by and including longitudinally and laterally extending passages in said stem connecting one end of said tubular member to the atmosphere.

References Cited in the file of this patent

UNITED STATES PATENTS

| | | | |
|---|---|---|---|
| 2,370,371 | 2/45 | Pratt | 251—325 XR |
| 2,965,351 | 12/60 | Campbell | 251—282 XR |
| 2,982,299 | 5/61 | Ksieski | 137—454.6 |
| 3,007,485 | 11/61 | Barker | 137—454.2 |
| 3,103,231 | 9/63 | Moen | 137—454.2 |

FOREIGN PATENTS 1,175,959   11/58   France.

ISADOR WEIL, *Primary Examiner.*